United States Patent
Chen

(10) Patent No.: US 10,785,202 B2
(45) Date of Patent: *Sep. 22, 2020

(54) SYSTEM AND METHOD FOR PROCESSING USER RIGHTS

(71) Applicant: Comcast Cable Communications, LLC, Philadelphia, PA (US)

(72) Inventor: Michael A. Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/156,785

(22) Filed: Oct. 10, 2018

(65) Prior Publication Data

US 2019/0281035 A1    Sep. 12, 2019

Related U.S. Application Data

(63) Continuation of application No. 15/438,185, filed on Feb. 21, 2017, now Pat. No. 10,142,317, which is a
(Continued)

(51) Int. Cl.
*H04L 29/06* (2006.01)
*H04N 21/436* (2011.01)
(Continued)

(52) U.S. Cl.
CPC .............. *H04L 63/08* (2013.01); *G06F 21/10* (2013.01); *H04L 63/10* (2013.01); *H04N 21/43622* (2013.01); *H04N 21/4627* (2013.01); *G06F 21/31* (2013.01); *G06F 21/60* (2013.01); *H04L 65/4084* (2013.01); *H04N 21/4325* (2013.01); *H04N 21/4335* (2013.01)

(58) Field of Classification Search
CPC ..... H04L 63/08; H04L 63/10; H04L 65/4084; G06F 21/10; G06F 21/31; G06F 21/60; H04N 21/43622; H04N 21/4627; H04N 21/4335; H04N 21/4325
See application file for complete search history.

(56) References Cited

U.S. PATENT DOCUMENTS

| | | | |
|---|---|---|---|
| 7,620,757 B2 * | 11/2009 | Katsumata | ......... H04N 7/17336 709/217 |
| 7,702,589 B2 * | 4/2010 | Candelore | ........... G06F 21/6218 380/201 |

(Continued)

FOREIGN PATENT DOCUMENTS

| | | |
|---|---|---|
| CA | 2812230 A1 | 10/2013 |
| EP | 0718840 A2 | 6/1996 |
| EP | 2651145 A2 | 10/2013 |

OTHER PUBLICATIONS

European Search Report and Written Opinion dated Nov. 28, 2013 by the European Patent Office for EP application 13162915.6, filed on Apr. 9, 2013 and published as EP 2651145 on Oct. 16, 2013 (Applicant—Comcast Corp.) (10 pages).

*Primary Examiner* — Ghodrat Jamshidi
(74) *Attorney, Agent, or Firm* — Ballard Spahr LLP

(57) ABSTRACT

A system and method for processing entitlement rights are disclosed. Content may be stored. A request for playback of the content may be received. A right of a user to view the content may be determined.

28 Claims, 6 Drawing Sheets

Related U.S. Application Data continuation of application No. 14/504,636, filed on Oct. 2, 2014, now Pat. No. 9,602,488, which is a continuation of application No. 13/444,555, filed on Apr. 11, 2012, now Pat. No. 8,887,304.

(51) Int. Cl.
  *H04N 21/4627* (2011.01)
  *G06F 21/10* (2013.01)
  *H04N 21/432* (2011.01)
  *H04N 21/4335* (2011.01)
  *G06F 21/31* (2013.01)
  *G06F 21/60* (2013.01)

(56) References Cited

U.S. PATENT DOCUMENTS

| | | | |
|---|---|---|---|
| 7,979,914 B2 | 7/2011 | Millman et al. | |
| 8,447,986 B2 * | 5/2013 | Weber | H04L 9/3215 |
| | | | 713/176 |
| 8,887,304 B2 | 11/2014 | Chen | |
| 9,602,488 B2 | 3/2017 | Chen | |
| 10,142,317 B2 | 11/2018 | Chen | |
| 10,296,879 B2 * | 5/2019 | Farrugia | G06F 21/10 |
| 2002/0076050 A1 * | 6/2002 | Chen | H04N 7/165 |
| | | | 380/231 |
| 2004/0139207 A1 | 7/2004 | de Jong | |
| 2004/0162787 A1 * | 8/2004 | Madison | G06F 21/10 |
| | | | 705/64 |
| 2005/0155079 A1 * | 7/2005 | Chen | H04N 7/17318 |
| | | | 725/115 |
| 2006/0047957 A1 * | 3/2006 | Helms | G06F 21/10 |
| | | | 713/165 |
| 2007/0036516 A1 * | 2/2007 | Kahn | H04N 5/85 |
| | | | 386/259 |
| 2007/0061378 A1 | 3/2007 | Lee et al. | |
| 2007/0179987 A1 * | 8/2007 | Lim | G06F 21/6218 |
| 2007/0239998 A1 * | 10/2007 | Beck | G06F 21/33 |
| | | | 713/193 |
| 2009/0178093 A1 * | 7/2009 | Mitsuji | H04N 7/1675 |
| | | | 725/104 |
| 2010/0095316 A1 * | 4/2010 | Iwabuchi | H04N 7/17318 |
| | | | 725/5 |
| 2010/0138351 A1 * | 6/2010 | Gilliam | G06F 21/10 |
| | | | 705/310 |
| 2011/0113122 A1 * | 5/2011 | Drope | G06F 21/10 |
| | | | 709/219 |
| 2011/0179356 A1 * | 7/2011 | Bassali | H04N 21/44016 |
| | | | 715/704 |
| 2011/0283365 A1 * | 11/2011 | Moritz | G06F 21/10 |
| | | | 726/28 |
| 2012/0102317 A1 * | 4/2012 | Mathur | G06F 21/10 |
| | | | 713/156 |
| 2013/0174223 A1 * | 7/2013 | Dykeman | G06F 21/10 |
| | | | 726/4 |
| 2013/0276141 A1 | 10/2013 | Chen | |
| 2015/0096054 A1 | 4/2015 | Chen | |
| 2018/0013740 A1 | 1/2018 | Chen | |

\* cited by examiner

SYSTEM AND METHOD FOR PROCESSING USER RIGHTS

CROSS REFERENCE TO RELATED APPLICATIONS

This application is a continuation of U.S. application Ser. No. 15/438,185 filed Feb. 21, 2017, which is a continuation of U.S. application Ser. No. 14/504,636 filed Oct. 2, 2014 and issued as U.S. Pat. No. 9,602,488, which is a continuation of U.S. Non-Provisional application Ser. No. 13/444,555 filed Apr. 11, 2012 and issued as U.S. Pat. No. 8,887,304, which are herein incorporated by reference in their entireties.

BACKGROUND

Currently, content can be provided to a user though any number of devices. However, in order to control the content provided by a particular device to a particular user, user rights or entitlement to the content typically must be processed and/or authenticated. One example of a system that requires a large number of entitlement checks is a network-based DVR system. In such a system, the entitlement to the content must be in place at the start of the recording or playback. Furthermore, time synchronized transactions impose a large transaction load on the network. For example, if one considers a population of five million DVR users, with each DVR being able to record two programs at once ("dual-tuner"), the required transaction load could spike to as high as ten million transactions at a particular time. Accordingly, there is a need for an efficient means to process voluminous requests for user rights authentication.

SUMMARY

It is to be understood that both the following general description and the following detailed description are exemplary and explanatory only and are not restrictive, as claimed. Provided are methods and systems for processing user rights and/or entitlement. The systems and methods of the present disclosure can be used to authenticate a user's right to consume content provided to a user through several devices. The systems and methods of the present disclosure can be used to control content provided to a particular device and/or user.

In an aspect, a method for processing user rights can comprise storing content at a first time, receiving a request for playback of the content at a second time, and processing a user right associated with the content to authenticate the user right in response to the request for playback, wherein the user right is authenticated based upon a state of the user right at the first time.

In another aspect, a method for processing user rights can comprise storing content at a first time, removing the content from storage at a second time unless a request for playback of the content is received at a third time prior to the second time, and if the request for playback is received at the third time, processing a user right associated with the content in response to the request for playback to authenticate the user right, wherein the user is authenticated based upon a state of the user right at the first time.

In a further aspect, a system for processing user rights can comprise a storage medium for storing content at a first time, a processor in communication with the storage medium, the processor configured to: receive a request for playback of the content at a second time; and authenticate a user right associated with the content in response to the request for playback, wherein the user right is authenticated based upon a state of the user right at the first time.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
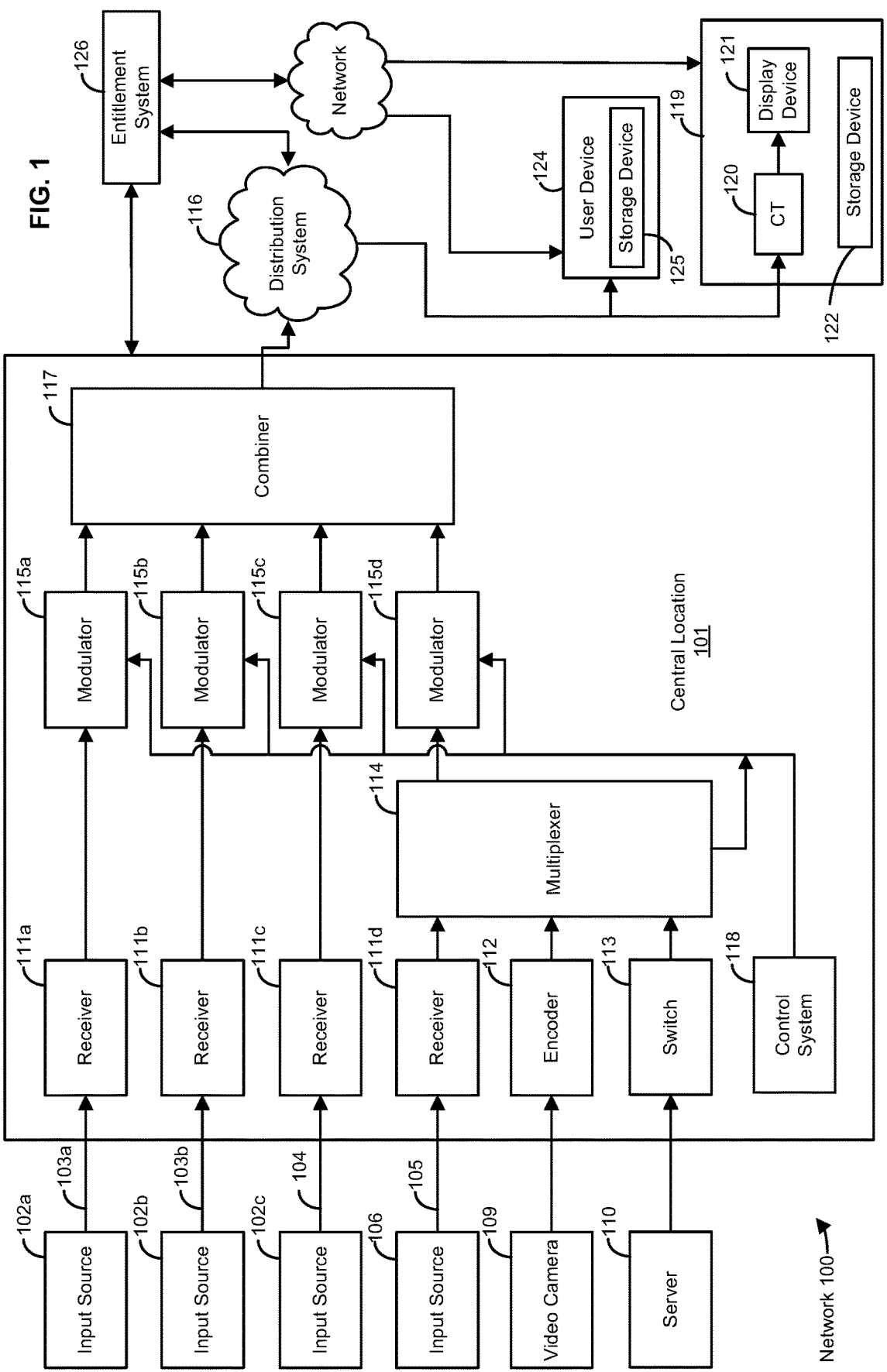
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, a system and network can be configured to control presentation of various types of content on a plurality of devices. In an aspect, user rights and/or entitlement to consume various content can be processed to determine whether a particular user and/or device has permission to consume the content.

FIG. 1 illustrates various aspects of an exemplary network in which the present methods and systems can operate. The present disclosure relates to systems and methods for processing user rights and controlling content presentation. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a headend, a processing center, etc.), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can create content or receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices, such as a video camera 109 or a server 110. The signals provided by the content sources can include, for example, a single content item or a multiplex that includes several content items. In an aspect, the central location 101 can create and/or receive application, such as interactive applications. Such applications can be related to a particular content.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators, 115a, 115b, 115c, and 115d, for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, there may be an interface comprising a decoder 120, such as a gateway or communications terminal (CT) that can decode, if needed, the signals for display on a display device 121, such as on a television set (TV) or a computer monitor. Various wireless devices may also be connected to the network at, or proximate, user location 119. Those skilled in the art will appreciate that the signal can be decoded in a variety of equipment, including an CT, a fixed or mobile computing device, a TV, a monitor, or satellite receiver. In an exemplary aspect, the methods and systems disclosed can be located within, or performed on, one or more wireless device, CT's 120, display devices 121, central locations 101, DVR's, home theater PC's, and the like. As an example, a storage device 122 can be in communication with one or more of the CT 120, the display device 121, and the central location 101 to send/receive content therebetween. As a further example, the storage device 122 can be located remotely from the user location 119, such as a network storage.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be an CT, a set-top box, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as a network storage medium.

In an aspect, an entitlement system or device 126 (e.g., a computing device functioning as an entitlement server 206, user rights authentication device, etc.) can be in communication with one or more of the CT 120 and the user device 124 (e.g., or other devices) to determine entitlement for a particular user and/or device. In an aspect, a user and/or device can have certain user rights associated with the content that the particular user and/or device can consume. As an example, a user may have the rights to store (e.g., buffer, cache, temporarily storage, long-term storage, local storage, remote, storage, etc.) certain programming on a digital recorder at a first time. However, other users and/or devices may not have the rights to store the same programming. Accordingly, when content is requested for playback, the user rights associated with the requested content are authenticated based upon the temporal relationship, in order to validate a particular entitlement at the time (e.g., the first time) the content was stored. In an aspect, a user can consume stored content as long as the user had the appropriate entitlements at the time the content was stored, not necessarily at the time the content is requested for playback. As an example, the authentication of the user rights/entitlement can be based upon a state/status of the user's rights at the first time and can be independent of the state/status of the user's rights at the second time (e.g., the time of playback). However, in certain aspects, user rights and entitlement can be authenticated at any time for any content.

In an aspect, the methods and systems can utilize digital audio/video compression such as MPEG, or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, MPEG-4, and subsequent MPEG standards are hereinafter referred to as MPEG. In an MPEG encoded transmission, content and other data are transmitted in packets, which collectively make up a transport stream. In an exemplary aspect, the present methods and systems can employ transmission of MPEG packets. However, the present methods and systems are not so limited, and can be implemented using other types of transmission and data.

As discussed in further detail below, a system and network can be used to authenticate entitlement of a particular user and/or device for the consumption of a particular content. As an example, a user and/or device may have entitlement at the time of purchase or storage of a content, but not at the time of playback. Accordingly, the system and network can authenticate entitlement retroactively to determine if a user and/or device has the right consume a particular content.

Figure 2:
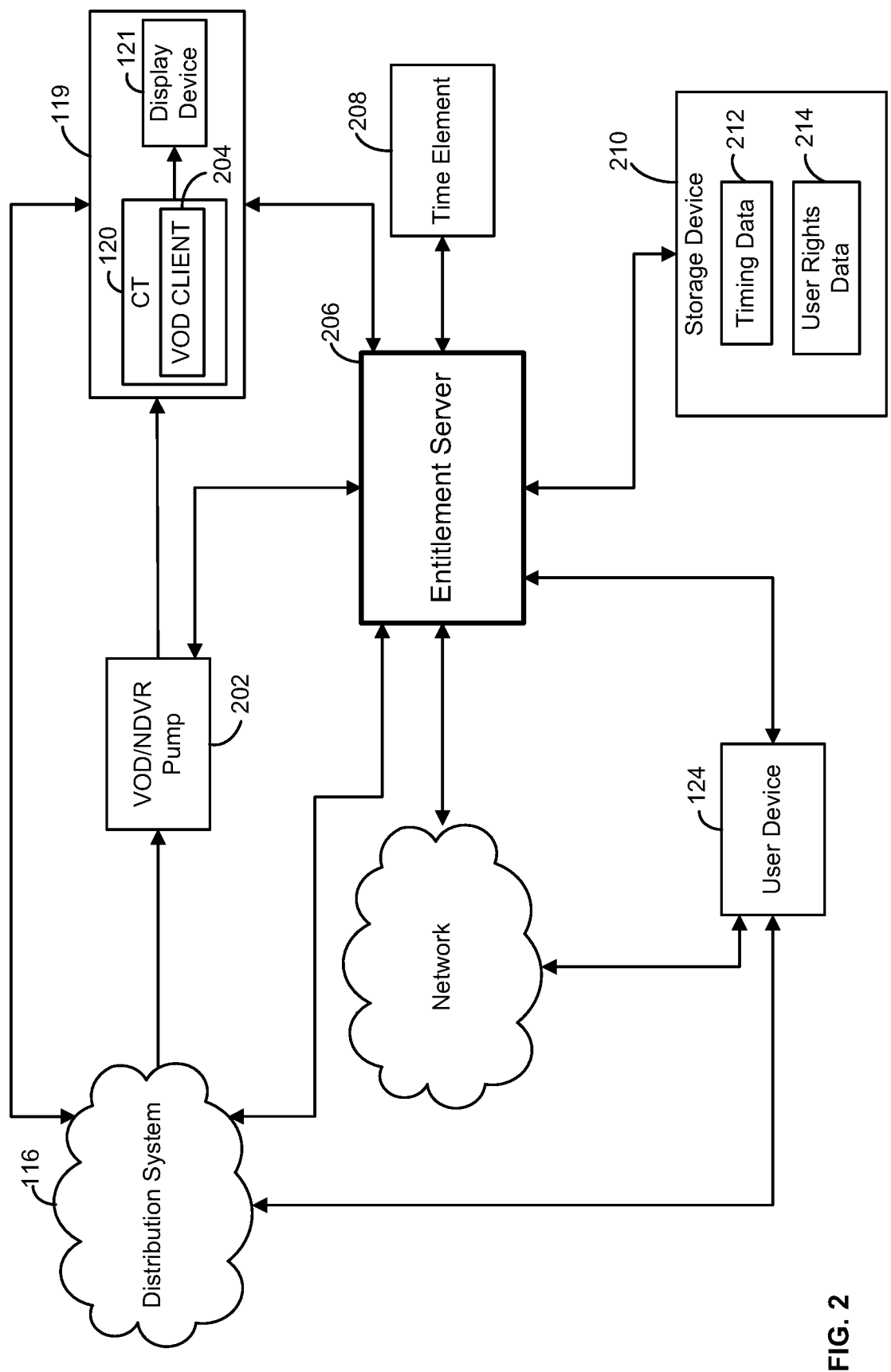
FIG. 2 is a block diagram on an exemplary network.

In an aspect, FIG. 2 illustrates various aspects of an exemplary system in which some of the disclosed methods and systems can operate. As an example, the distribution system 116 can communicate with the CT 120 or other content processing device at the user location 119 via, for example, a linear transmission. As a further example, the distribution system 116 can transmit signals to a video on demand (VOD) pump 202 or network digital video recorder pump for processing and delivery to the user location 119.

In an aspect, the CT 120, such as a set-top box, can comprise a software component such as VOD client 204 to communicate with a VOD server (e.g., server 110). The VOD client 204 can communicate requests to the VOD server or a VOD management system in communication with the VOD server to configure the VOD pump 202 to transmit content to the CT 120 for displaying the content to a user. Other content distribution systems can be used to transmit content signals to the user location 119. The foregoing and following examples of video transmissions are also applicable to transmission of other data. As an example, content can be received and stored for subsequent playback.

In an aspect, the user device 124 can receive content from the distribution system 116, the Internet Protocol network, such as the Internet, and/or a communications network such as a cellular network, for example. Other network and/or content sources can transmit content to the user device 124. As an example, the user device 124 can receive streaming data, audio and/or video for playback to the user. As a further example, the user device 124 can receive user experience (UX) elements, such as widgets, applications, and content for display via a human-machine interface. In an aspect, user device 124 can be disposed inside or outside the user location 119. As an example, content can be received and stored for subsequent playback.

In an aspect, an entitlement server 206 can be in communication with the distribution system 116, the CT 120, the user device 124, the Internet, and/or a communication network to receive information relating to content being delivered to a particular user. As an example, other communications elements, such as software, virtual elements, computing devices, router devices, and the like, can comprise or serve as entitlement server 206. As a further example, the entitlement server 206 can process user rights associated with content and/or programming to determine the permissions of a particular user or device, as described in further detail herein. In an aspect, the entitlement server 206 can be disposed remotely from the user location 119. However, the entitlement server 206 can be disposed anywhere, including at the user location 119 to reduce network latency, for example.

In an aspect, a time element 208 can be in communication with at least the entitlement server 206 to provide a timing reference thereto. As an example, the time element 208 can be a clock. As a further example, the time element 208 can transmit information to the entitlement server 206 for associating a time stamp with a particular event received by the entitlement server 206. In an aspect, the entitlement server 206 can cooperate with the time element 208 to associate a time stamp with events having an effect on the content delivered to the CT 120 and/or the user device 124, such as, for example, a channel tune, a remote tune, remote control events, playpoint audits, playback events, program events including a program start time and/or end time and/or a commercial/intermission time, and/or playlist timing events, and the like.

In an aspect, a storage device 210 can be in communication with the entitlement server 206 to allow the entitlement server 206 to store and/or retrieve data to/from the storage device 210. As an example, the storage device 210 can store data relating to a timing data 212 and/or a user rights data 214 relating to content transmitted or scheduled to be transmitted to the CT 120 and/or the user device 124. In an aspect, the timing data 212 can be a time stamp or other time marker for indicating a date and/or time associated with one or more of a transmission of content, a request for content, a request for playback, a storage of content, a deletion of content, and/or a state/status and/or a change in state/status of an entitlement or user right. As an example, the timing data 212 can comprise any number of time-related entries and/or markers. As a further example, the timing data 212 can comprise one or more of a table of time-related data entries, a timing log, and a database of time-related information. Other information can be stored as the timing data.

In an aspect, the user rights data 214 can comprise information relating to the permissions and/or entitlements associated with a particular user and/or device. As an example, the user rights data 214 can comprise information, such as subscription information, identification information, location information, and/or timing information relating to a particular user or user device. In an aspect, the user rights data 214 can be associated with a source of the content (e.g., a subscription data or a pay-per-view data). As a further example, the user rights data 214 can have time stamps or markers associated therewith. The storage device 210 can store information relating to users, user preferences, and user devices and configurations.

In an aspect, the user rights are authenticated (e.g., by entitlement system 126, entitlement server 206, and/or software or devices configured for rights authentication) based upon a state of the user rights data 214 at the first time. As an example, at the first time, when the requested content is stored, the user rights data 214 can be time stamped in order to have a temporal relationship of a particular user's entitlements at the time (e.g., the first time) when content is stored. As a further example, when the content is requested for playback, the user rights associated with the requested content are authenticated based upon the temporal relationship, in order to validate the user's entitlement at the time (e.g., the first time) the content is stored. In an aspect, a user can consume stored content as long as the user had the appropriate entitlements at the time the content was stored, not necessarily at the time the content is requested for playback. As an example, the authentication of the user rights/entitlement can be based upon a state/status of the user's rights at the first time and can be independent of the state/status of the user's rights at the second time (e.g., the time of playback). However, in certain aspects, user rights and entitlement can be authenticated at any time for any content.

As described in greater detail below, a system and network can be configured to control presentation of various types of content on a plurality of devices. In an aspect, user rights and/or entitlement to consume various content can be processed to determine whether a particular user and/or device has permission to consume the content.

Figure 3:
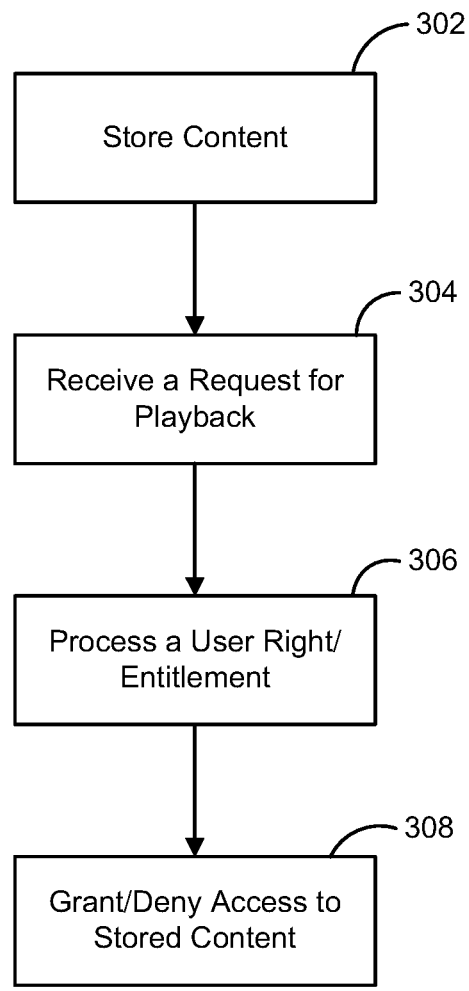
FIG. 3 is a flow chart of an exemplary method.

FIG. 3 illustrates a method for controlling media content presented to a user. In an aspect, in step 302, content can be stored at a first time. In an aspect, content can be stored on a device such the user device 124 or other content device such as a digital video recorder. As an example, the content can be stored remotely from the user device 124 and/or user location 119 such as at a network storage DVR (NDVR). As a further example, the stored content can be time stamped based upon the date and/or time of storing the content. In an aspect, the first time can be represented by the timing data 212.

In step 304, a request for playback of the stored content can be received. In an aspect, the request for playback can be received at a second time. As an example, the second time can be subsequent to the first time at which the content was stored. In an aspect, the request for playback can be received (e.g., directly or indirectly) by the entitlement server 206. As a further example, the request for playback can be received by the user device 124 or other device for rendering playback of content to the user. Accordingly, the device receiving the request for playback can transmit a request for authentication/verification prior to rendering the content to the user. As an example, the request for authentication can be transmitted to the entitlement server 206. In an aspect, the second time can be represented by the timing data 212.

In step 306, user rights/entitlements associated with the stored content can be authenticated or validated in response to the request for playback. In an aspect, the entitlement server 206 can receive the request for playback or the request for authentication and can process the user rights associated with the requested content. The entitlement server 206 can retrieve at least the user rights data 214 associated with the requested content and/or the requesting user and/or device. The entitlement server 206 can compare the user rights data 214 to the permissions/entitlements associated with the requested content to authenticate the user's right to consume the content. In an aspect, the user rights are authenticated based upon a state of the user rights data 214 at the first time. As an example, at the first time, when the requested content is stored, the user rights data 214 can be time stamped in order to have a temporal relationship of a particular user's entitlements at the time (e.g., the first time) when content is stored. As a further example, when the content is requested for playback, the user rights associated with the requested content are authenticated based upon the temporal relationship, in order to validate the user's entitlement at the time (e.g., the first time) the content was stored.

In step 308, the entitlement server 206 can make a determination (e.g., grant or deny, and/or some other limitation or allowance of consuming content) of whether the user and/or device has sufficient rights to consume the requested content. In an aspect, a user can consume content (e.g., requested content, previously stored content, NDVR content, etc.) as long as the user had the appropriate entitlements at the time the content was stored, not necessarily at the time the content is requested for playback. In an aspect, the authentication of the user rights/entitlement can be based upon a state/status of the user's rights at the first time and can be independent of the state/status of the user's rights at the second time (e.g., the time of playback). However, user rights and entitlement can be authenticated at any time for any content.

As described in greater detail below, a storage device can store content for later playback. As an example, content can be stored on a network device. As a further example, if a request to playback the content is not received within a pre-determined time period, the content can be removed from storage to conserve storage space.

Figure 4:
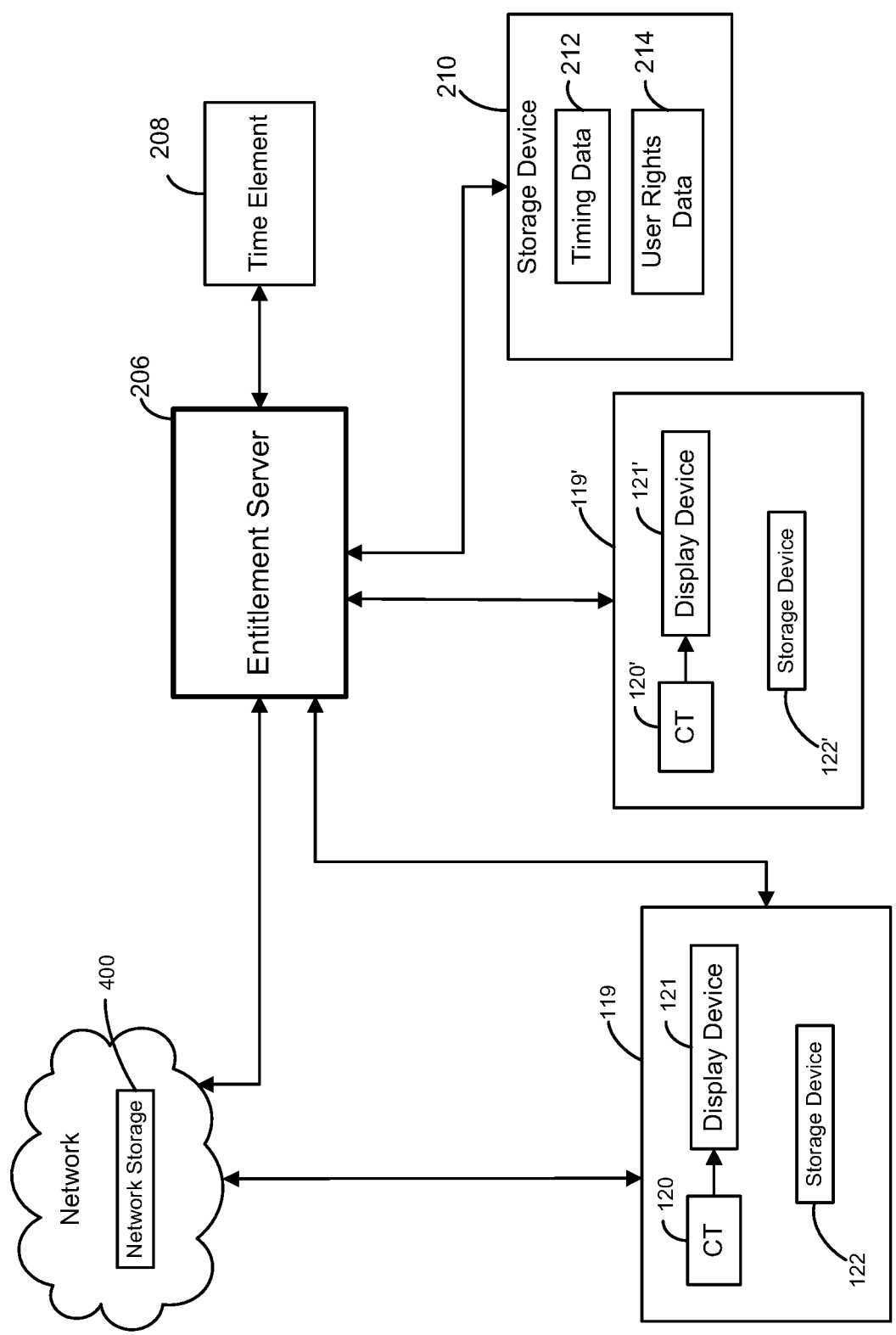
FIG. 4 is a block diagram on an exemplary network.

FIG. 4 illustrates various aspects of an exemplary system in which the present methods can operate. As an example, a network or distribution system can communicate with the CT 120 (e.g., or user device 124) at the user location 119 (e.g., or other location) via a linear or non-linear transmission. Any means of transmitting content to the CT 120 or user device can be used, such as broadcast, multicast, unicast, etc. As a further example, a network or distribution system can communicate with a second CT 120' (e.g., or second user device) at a second user location 119' (e.g., or other user location) via a linear or non-linear transmission. Any means of transmitting content to the second CT 120' or user device can be used, such as broadcast, multicast, unicast, etc.

In an aspect, a network storage 400 medium can be in communication with the network to one or more of, store, transmit, and/or receive content and other data from various devices at various locations (e.g., user location 119, 119') in communication with the network. As an example, the network storage 400 can be a network digital video recorder for storing content to be subsequently transmitted to one or more users/devices. In an aspect, one or more users and/or devices can store data (e.g., content) on the network storage 400. As an example, one or more users and/or devices can request playback of the data stored on the network storage 400. As a further example, at a first time, when the requested content is stored to the network storage 400, the user rights data 214 can be time stamped in order to have a temporal relationship of a particular user's entitlements at the time (e.g., the first time) when content is stored. In an aspect, when the content is requested for playback, the user rights associated with the requested content are authenticated based upon the temporal relationship, in order to validate the user's entitlement at the time (e.g., the first time) the content is stored. However, in certain aspects, user rights and entitlement can be authenticated at any time for any content.

Figure 5:
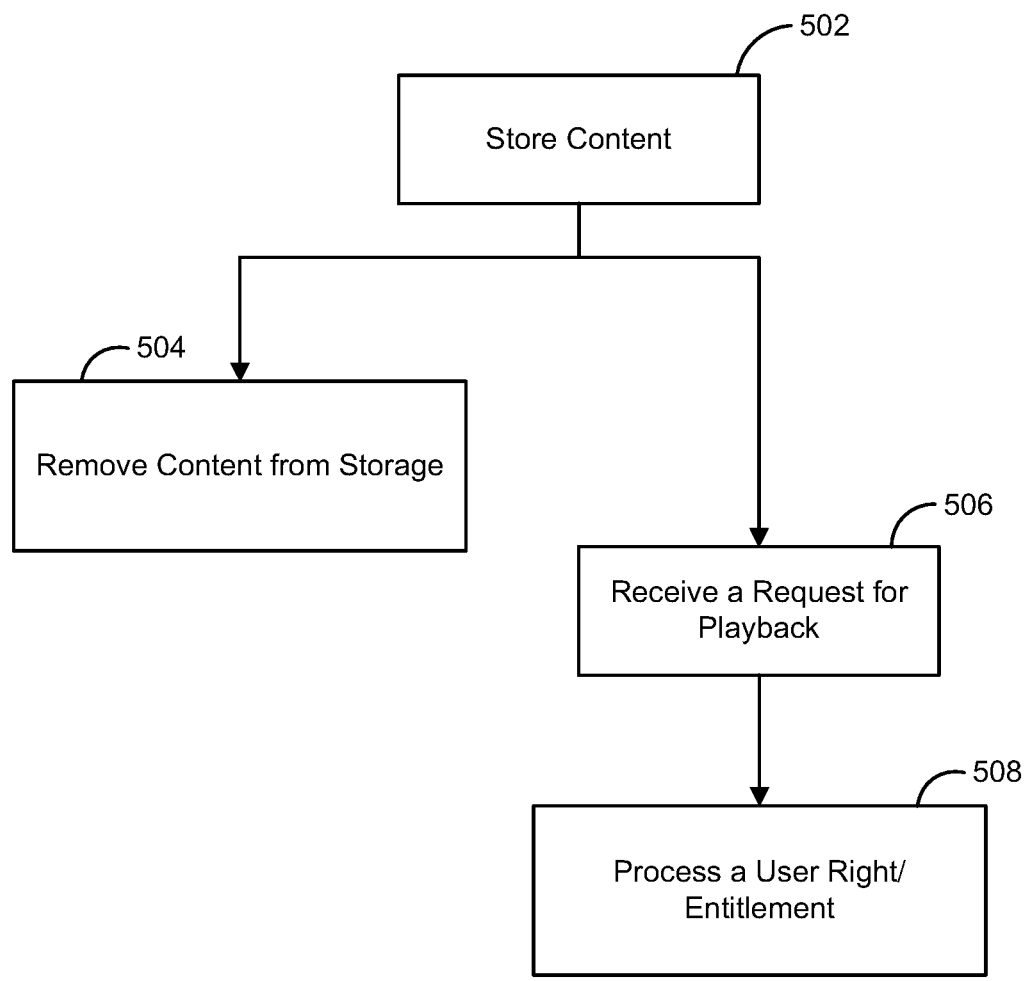
FIG. 5 is a flow chart of an exemplary method.

In an aspect, FIG. 5 illustrates a method for controlling media presented to a user. In an aspect, in step 502, content can be stored (e.g., buffered, cached, temporarily stored, permanently stored, locally stored, remotely stored, etc.) at a first time. As an example, the content can be stored on the network storage 400. However, the content can be stored on other mediums. In an aspect, content can be stored on a device such the user device 124 or other content device such as a digital video recorder. As an example, the content can be stored remotely from the user device 124 and/or user location 119. As a further example, the stored content can be time stamped based upon the date and/or time of storing the content. In an aspect, the first time can be represented by the timing data 212.

In an aspect, in step 504, the content can be removed (e.g., automatically) from storage at a pre-determined time period after the first time. As an example, the content can be removed from storage unless a request for playback of the content is received at a second time prior to the pre-determined time period after the first time. As an example, the time period can be set by a source of the content, a network manager/provider, or an end-user. However, any time period can be set by any user or device.

In an aspect, in step 506, a request for playback of the stored content can be received. As an example, the request for playback can be received at a second time. The second time can be subsequent to the first time at which the content was stored. In an aspect, the request for playback can be received (e.g., directly or indirectly) by the entitlement server 206. As a further example, the request for playback can be received by one or more of the CT 120, 120' and/or user device(s) or other device for rendering playback of content to the user. Accordingly, the device receiving the request for playback can transmit a request for authentication/verification prior to rendering the content to the user. As an example, the request for authentication can be transmitted to the entitlement server 206. In an aspect, the second time can be represented by the timing data 212.

In an aspect, in step 508, if a request for playback of the stored content is received at the second time prior to the expiration of the pre-determined time period after the first time, a user right or entitlement can be processed. In an aspect, a user rights/entitlements associated with the stored content can be authenticated or validated in response to the request for playback. In an aspect, the entitlement server 206 can receive the request for playback or the request for authentication can process the user rights associated with the requested content. As an example, the entitlement server 206 can retrieve at least the user rights data 214 associated with the requested content and/or the requesting user and/or device. As a further example, the entitlement server 206 can compare the user rights data 214 to the permissions/entitlements associated with the requested content to authenticate the user's right to consume the content. In an aspect, the user rights are authenticated based upon a state of the user rights data 214 at the first time. As an example, at the first time, when the requested content is stored, the user rights data 214 can be time stamped in order to have a temporal relationship of a particular user's entitlements at the time (e.g., the first time) when content is stored. As a further example, when the content is requested for playback, the user rights associated with the requested content are authenticated based upon the temporal relationship, in order to validate the user's entitlement at the time (e.g., the first time) the content is stored. In an aspect, a user can consume stored content as long as the user had the appropriate entitlements at the time the content was stored, not necessarily at the time the content is requested for playback. As an example, the authentication of the user rights/entitlement can be based upon a state/status of the user's rights at the first time and can be independent of the state/status of the user's rights at the second time (e.g., the time of playback). However, in certain aspects, user rights and entitlement can be authenticated at any time for any content.

Conventionally, a plurality of different users/devices may request that a particular program or content be recorded at a set time (e.g., a scheduled show time). Accordingly, a processing load for conventional entitlement authentication can be large at particular times. However, since the entitlement server 206 of the present disclosure can process the user rights subsequent to a record or storage time, the processing load can be minimized. For example, any number of users can request that content be stored or recorded, but not all users will request playback immediately. Accordingly, the entitlement server 206 can spread the authentication processing load over a larger period time (e.g., from the schedule show time until the last user requests playback of the stored content). Since user rights data 214 associated with each of the users can include a time stamp associated with the request for recording/storage, the entitlement server 206 can process retroactive user rights at any time. In an aspect, a deadline can be set to not allow any further requests for playback after a pre-determined time period from the request for storage. In this way, the entitlement server 206 need only process entitlements for requests within a finite period of time.

Figure 6:
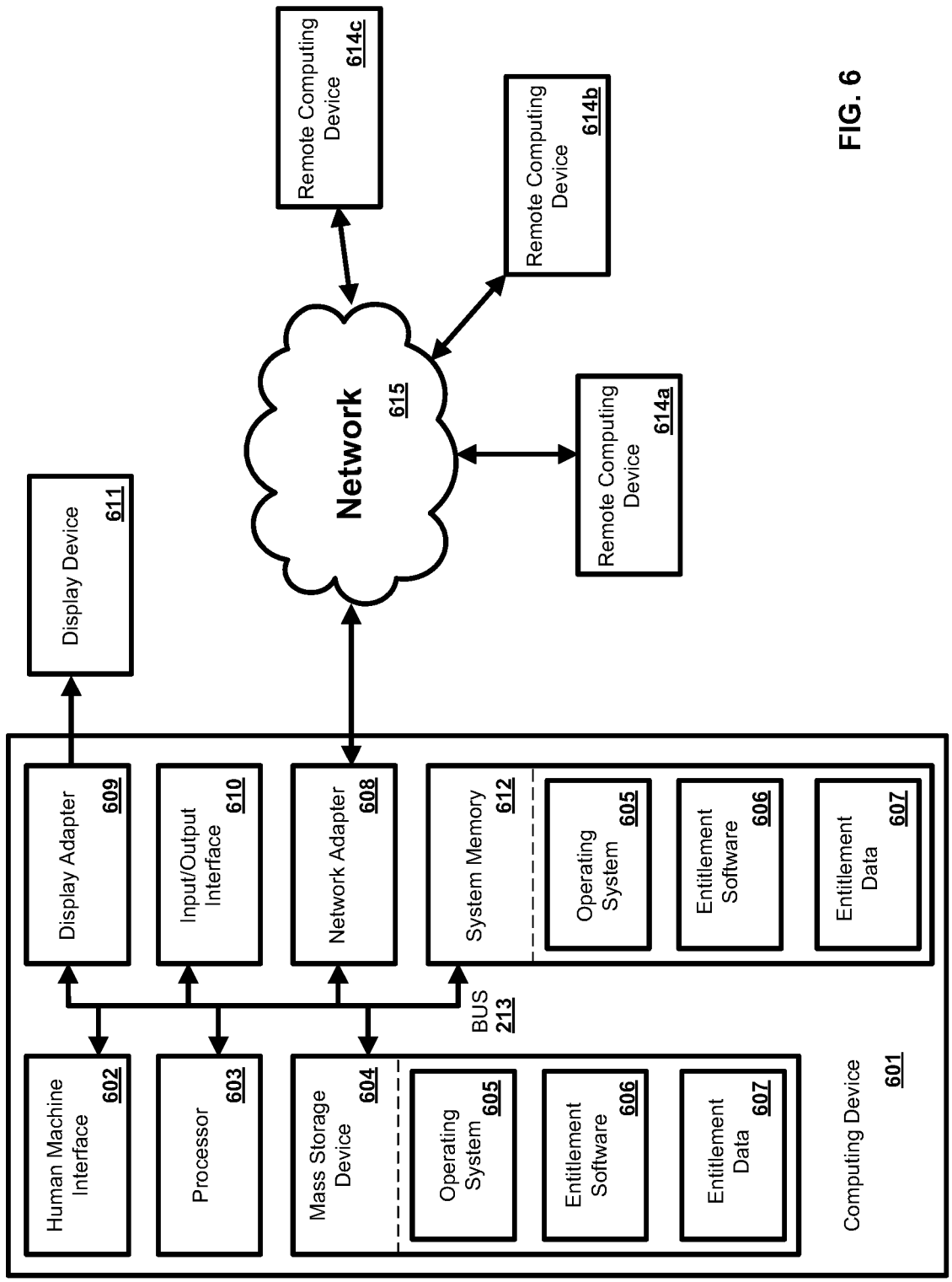
FIG. 6 is a block diagram of an exemplary computing device.

In an exemplary aspect, the methods and systems can be implemented on a computing system such as computing device 601 as illustrated in FIG. 6 and described below. By way of example, entitlement server 206 of FIG. 2 can be a computing device as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, entitlement software 606, entitlement data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing device 601 typically comprises a variety of computer readable media.

Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as entitlement data 607, and/or program modules, such as operating system 605 and entitlement software 606 that are immediately accessible to and/or are presently operated on by the processing unit 603.

In another aspect, the computing 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computing device 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and entitlement software 606. Each of the operating system 605 and entitlement software 606 (or some combination thereof) can comprise elements of the programming and the entitlement software 606. Entitlement data 607 can also be stored on the mass storage device 604. Entitlement data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, visual systems, such as Microsoft's Kinect, audio systems that process sound such as music or speech, a traditional silver remote control, tactile input devices such as gloves, touch-responsive screen, body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computing device 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing device 601 via Input/Output Interface 610. Any step and/or result of the methods can be output in any form to an output device. Such output can be any form of visual representation, including, but not limited to, textual, graphical, animation, audio, tactile, and the like. The display 611 and computing device 601 can be part of one device, or separate devices.

The computing device 601 can operate in a networked environment using logical connections to one or more remote computing devices 614*a,b,c*. By way of example, a remote computing device can be a personal computer, portable computer, a smartphone, a server, a router, a network computer, a peer device or other common network node, and so on. Logical connections between the computing device 601 and a remote computing device 614*a,b,c* can be made via a network 615, such as a local area network (LAN) and a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of entitlement software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   storing content, wherein a user of a user device has a user right to consume the content at a first time when the content is stored;
   receiving, by a computing device from the user device, a request for playback of the content at a second time;

determining, by the computing device, at the second time, that the user does not have the user right to consume the content at the second time;

determining, by the computing device, at the second time, that the user had the user right to consume the content at the first time, independent of the user right to consume the content at the second time; and providing, based on the determination that the user had the user right to consume the content at the first time, the content to the user device at the second time, wherein the content is configured for output by the user device.

2. The method of claim 1, wherein the content is stored on a network device.

3. The method of claim 1, wherein the content is stored on the user device.

4. The method of claim 1, further comprising removing the content from storage after a predetermined time period from the first time when the content is stored.

5. The method of claim 1, further comprising receiving, from the user device, a request to store the content.

6. The method of claim 1, wherein the user right to consume the content comprises subscription information.

7. The method of claim 1, further comprising retrieving, by the computing device, user rights data comprising the user right to consume the content.

8. A system comprising:
a first computing device, configured to store content, wherein a user of a user device has a user right to consume the content at a first time when the content is stored; and
a second computing device, configured to:
receive, from the user device, a request for playback of the content at a second time,
determine, at the second time, that the user does not have the user right to consume the content at the second time, and
determine, at the second time, that the user had the user right to consume the content at the first time, independent of the user right to consume the content at the second time, wherein the first computing device is further configured to provide the content to the user device at the second time based on the determination that the user had the user right to consume the content at the first time, wherein the content is configured for output by the user device.

9. The system of claim 8, wherein the first computing device comprises a network device.

10. The system of claim 8, wherein the first computing device comprises the user device.

11. The system of claim 8, wherein the first computing device is further configured to remove the content from storage after a predetermined time period from the first time when the content is stored.

12. The system of claim 8, wherein at least one of the first computing device or the second computing device is further configured to receive, from the user device, a request to store the content.

13. The system of claim 8, wherein the user right to consume the content comprises subscription information.

14. The system of claim 8, wherein the second computing device is further configured to retrieve user rights data comprising the user right to consume the content.

15. An apparatus comprising:
one or more processors; and
a memory storing processor executable instructions that, when executed by the one or more processors, cause the apparatus to:
cause content to be stored, wherein a user of a user device has a user right to consume the content at a first time when the content is stored,
receive, from the user device, a request for playback of the content at a second time,
determine at the second time, that the user does not have the user right to consume the content at the second time,
determine at the second time, that the user had the user right to consume the content at the first time, independent of the user right to consume the content at the second time, and
cause, based on the determination that the user had the user right to consume the content at the first time, the content to be provided to the user device at the second time, wherein the content is configured for output by the user device.

16. The apparatus of claim 15, wherein the content is stored on a network device.

17. The apparatus of claim 15, wherein the content is stored on the user device.

18. The apparatus of claim 15, wherein the processor executable instructions, when executed by the one or more processors, further cause the apparatus to cause removal of the content from storage after a predetermined time period from the first time when the content is stored.

19. The apparatus of claim 15, wherein the processor executable instructions, when executed by the one or more processors, further cause the apparatus to receive, from the user device, a request to store the content.

20. The apparatus of claim 15, wherein the user right to consume the content comprises subscription information.

21. The apparatus of claim 15, wherein the processor executable instructions, when executed by the one or more processors, further cause the apparatus to retrieve user rights data comprising the user right to consume the content.

22. One or more non-transitory computer readable media storing processor executable instructions that, when executed by at least one processor, cause the at least one processor to:
store content, wherein a user of a user device has a user right to consume the content at a first time when the content is stored;
receive, from the user device, a request for playback of the content at a second time;
determine, at the second time, that the user does not have the user right to consume the content at the second time;
determine, at the second time, that the user had the user right to consume the content at the first time, independent of the user right to consume the content at the second time; and
provide, based on the determination that the user had the user right to consume the content at the first time, the content to the user device at the second time, wherein the content is configured for output by the user device.

23. The one or more non-transitory computer readable media of claim 22, wherein the content is stored on a network device.

24. The one or more non-transitory computer readable media of claim 22, wherein the content is stored on the user device.

25. The one or more non-transitory computer readable media of claim 22, wherein the processor executable instructions further cause the at least one processor to remove the content from storage after a predetermined time period from the first time when the content is stored.

26. The one or more non-transitory computer readable media of claim 22, wherein the processor executable instructions further cause the at least one processor to receive, from the user device, a request to store the content.

27. The one or more non-transitory computer readable media of claim 22, wherein the user right to consume the content comprises subscription information.

28. The one or more non-transitory computer readable media of claim 22, wherein the processor executable instructions further cause the at least one processor to retrieve user rights data comprising the user right to consume the content.

\* \* \* \* \*